United States Patent

[11] 3,604,992

[72] Inventors Azmi S. Audeh
Camarillo;
Anil N. Deodhar, West Los Angeles; Henry G. Glattfelder, Los Angeles, all of, Calif.

[21] Appl. No. 10,255
[22] Filed Feb. 10, 1970
[45] Patented Sept. 14, 1971

[54] REEL SERVO SYSTEM
14 Claims, 2 Drawing Figs.

[52] U.S. Cl. .......... 318/6, 318/7
[51] Int. Cl. .......... B65h 59/38, H02p 7/68
[50] Field of Search .......... 318/6, 7

[56] References Cited

UNITED STATES PATENTS

| | | | |
|---|---|---|---|
| 3,343,052 | 9/1967 | Youngstrom | 318/6 |
| 3,370,802 | 2/1968 | Wooldridge et al. | 318/7 X |
| 3,409,240 | 11/1968 | Moritz | 318/6 X |
| 3,462,659 | 8/1969 | Lee | 318/6 |
| 3,482,229 | 12/1969 | Burr | 318/6 X |

*Primary Examiner*—T. E. Lynch
*Attorney*—Robert G. Clay

ABSTRACT: A reel servosystem for a digital magnetic tape transport responds to tape loop length signals from two spaced-apart linear sensors in a vacuum chamber and a reel motor braking signal which is proportional to tape velocity at some point between the vacuum chamber and the associated tape reel. A Schmitt trigger increases the tape loop length signals by a selected amount whenever they exceed a threshold magnitude thereby providing a more rapid response and cancelling the effect of the braking signal. A summing junction provides a signal representing the sum of the tape loop length signals and the reel motor-braking signal to drive the reel motor. During steady state operation the reel motor drive signal is proportional to the length of the tape loop and maintains the tape loop at selected reference positions within the vacuum chamber dependent on direction.

INVENTORS
AZMI S. AUDEH
ANIL N. DEODHAR
HENRY G. GLATTFELDER
BY
Fraser and Bogucki
ATTORNEYS INVENTORS
AZMI S. AUDEH
ANIL N. DEODHAR
HENRY G. GLATTFELDER
BY
Fraser and Bogucki
ATTORNEYS

REEL SERVO SYSTEM

BACKGROUND OF THE INVENTION

1. Field of the Invention

This invention relates to digital magnetic tape transports and particularly to reel servo controls for such transports and other systems using tape loop-forming buffer devices such as a vacuum chamber.

Digital tape transports move a magnetic tape intermittently and bidirectionally past a read-write head so that data may be read from or written on the tape. A high-speed intermittent drive system, usually of the single or dual capstan type, imparts the desired motion to the tape in the vicinity of the heads. However, the tape reels and reel motors have substantially larger inertia and it is impractical to require that they follow the rapid reversals, accelerations and decelerations of the tape drive. For this reason the buffer, usually a tape storage arm or vacuum chamber, is placed between the capstan and each reel. Thus, when a sudden reversal by the capstan causes it to draw or supply tape faster than a reel can unwind or wind, the excess tape can be supplied or stored by the buffer device and the slower acting reel can be controlled with a degree of independence of the tape drive.

This invention provides an improved system for controlling the operation of a reel motor so as to maintain control of the position of variable length buffer loops in such a system or in related applications.

2. Description of the Prior Art

In one prior art technique for controlling the reel motor, the tape loop is caused to oscillate about one or the other of a pair of sensors depending upon the direction of tape motion. In this so-called bang-bang mode of operation, an optimum position is sought to be maintained for protection against sudden reversal of direction. Generally, the reel motor is being constantly accelerated at a maximum rate in one direction or the other, and a large, high-power motor is needed for the necessary speed of response. The results are expressed in terms of high duty cycles with consequent temperature buildup, motors of excessive size and cost, or a combination of these.

A different technique of controlling a reel motor is to cover substantially the entire length of a tape storage chamber with a single linear photoelectric sensor for generating an analog tape loop position signal. Reference voltages may be established to indicate desired loop lengths, and a servosystem then operates to generate an error signal from the difference between the actual position signal from the linear sensor and the desired reference voltage. Establishing linearity is however very difficult, and using an extremely long sensor of adequate linearity, sensitivity and freedom from noise is generally excessively expensive and impractical. In addition a decrease in sensor sensitivity with aging can result in loss of tape loop control.

One method for controlling a reel motor which has proven to be very effective is shown in a copending application, Ser. No. 877,278, filed Nov. 17, 1969, and assigned to the assignee of the present invention. The arrangement described therein employs linear sensors to obtain a proportional tape loop position signal in a manner similar to the present invention. However, that arrangement combines the analog tape loop position signal with digital signals representing tape direction on opposite sides of the loop forming device in digital logic circuitry to obtain the reel drive signal. The present invention uses only analog signals in deriving the reel motor drive signal.

SUMMARY OF THE INVENTION

In accordance with the invention, a loop length control system for a digital magnetic tape transport or other system having a variable length buffer mechanism controls the length of a tape loop within the buffer mechanism completely independently of the capstan or other tape drive using generated analog signals. Relatively sort length, spaced-apart analog position sensors are used in conjunction with a tachometer positioned between the buffer mechanism and the reel for maintaining the loop at either one of the analog sensors, depending upon direction of tape drive, and for selectively braking the high inertia reel drive motor when the loop is between the sensors. The arrangement permits intermittent, bidirectional operation of the tape, but also maintains precise and stable control of a variable length device with minimum power drain, and with inexpensive sensor elements.

In one example of a digital magnetic tape transport reel servo in accordance with the invention, two relatively short solar cell sensors are disposed at spaced-apart locations along the vacuum chamber. Each sensor responds to the tape loop to generate a signal varying linearly with position of the loop along the length of the sensor from zero value when the tape loop is in the zone between the sensors to a maximum value when the loop is on the side of ether sensor opposite the zone therebetween. The signals generated by the two different sensors are of opposite polarity. A tachometer positioned along the tap path between the vacuum chamber and the reel provides a braking signal which is proportional to tape velocity. Schmitt trigger devices provide a step increase in the signals from the linear sensors whenever the signals exceed a selected threshold. This step provides a faster response rate. In addition when the reel motor accelerates sufficient so that the differential tape loop speed is zero, the feedback signal from the tachometer is cancelled by the step, thus bringing the tape loop to rest at a point on the linear sensor. When the loop is in the zone between the two sensors, the sensor signals assume zero value and there is no cancellation of the braking signal. The reel motor is rapidly decelerated, the distance between the two sensors being sufficient to permit the reel motor to become stopped while the tape loop remains between them. Observation of this criterion is sufficient to account for the time constant of a slower acting reel motor by virtue of the selected relationship between the positions of the sensors and the associated length of the vacuum chamber available for storage. Further, the arrangement is such that the tape drive automatically moves the loop toward the proper sensor for maintaining optimum position of the tape loop for a given direction of tape movement, thus assuring that maximum usage is made of the storage capacity of the buffer chamber. When the tape drive operates intermittently or continuously in one direction of movement, the analog sensor utilized for that particular direction generates a linear signal which, when boosted by the Schmitt trigger device, adequately cancels the braking signal and provides the desired precise and stable control of loop length.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
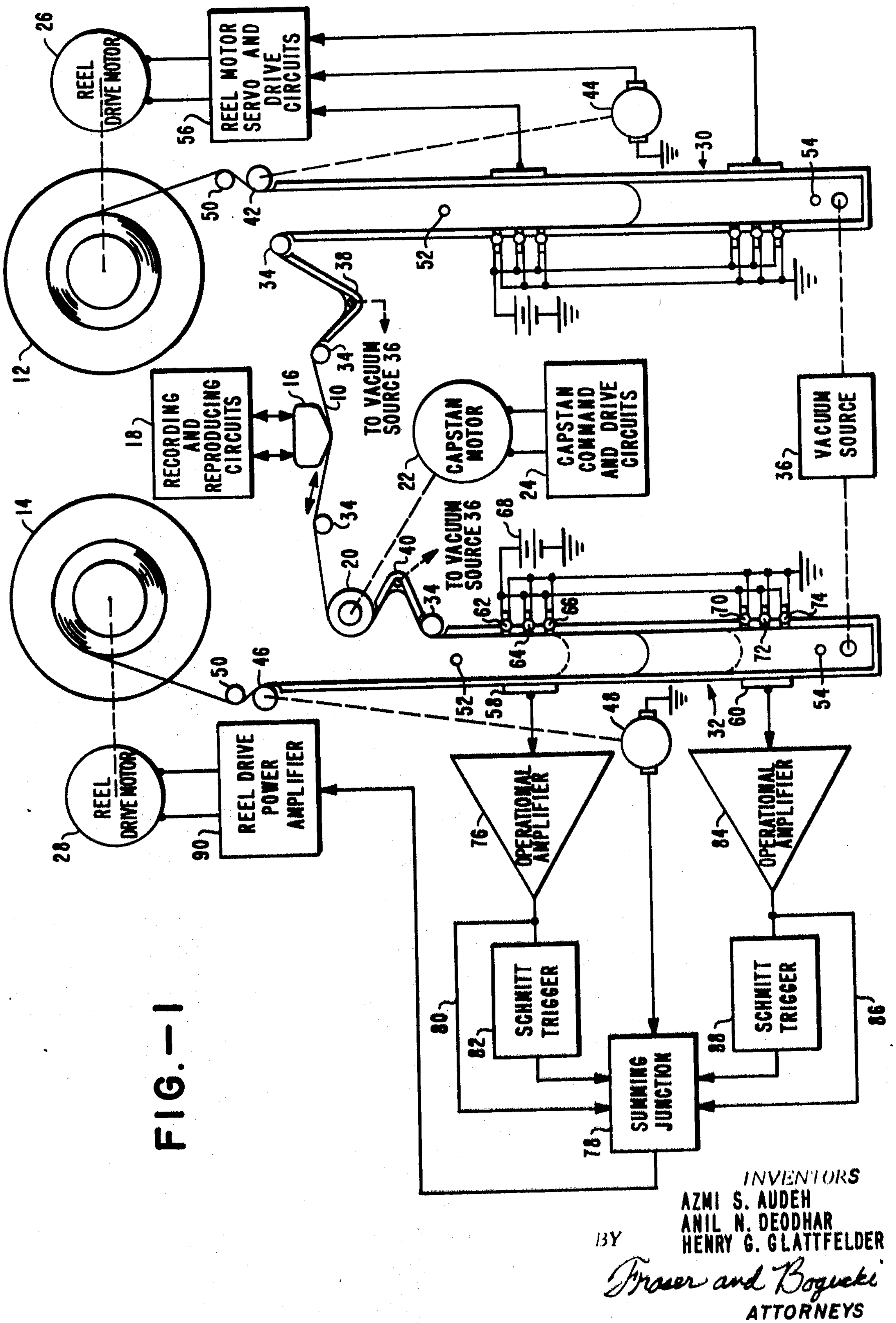
FIG. 1 is a combined simplified elevational view and block diagram of a digital magnetic tape transport system employing a reel servo arrangement according to the invention; and, FIGS. 2A–2F are diagrammatic plots of analog signals for various tape loop positions useful in explaining the operation of the reel servo arrangement shown in FIG. 1.

Although the invention is applicable to use in a number of different contexts, it is described in conjunction with digital magnetic tape transports, inasmuch as these provide extremely exacting demands upon variable loop length control systems. In the digital magnetic tape transport illustrated in FIG. 1, the magnetic tape 10 is passed between a supply reel 12 and a takeup reel 14 across a magnetic head 16 coupled to recording and reproducing circuits 18. A digital control system for actuating the recording and reproducing circuits 18 is not shown for brevity, but may be assumed to be any conventional system utilized in the art.

The tape is driven in bidirectional, intermittent motion by a capstan 20, the single capstan 20 here being illustrative of one of the many different types of tape drive systems that may be utilized including pinch roller, vacuum and pneumatic mechanisms of the single capstan or dual capstan types. The present example is illustrative of a widely used class of magnetic tape transports in which the single capstan 20 is driven bidirectionally by a high torque-to-inertia ratio capstan motor 22. The acceleration and deceleration of the capstan motor 22 are electronically controlled by drive techniques now well known in the art, but here categorized as capstan command and drive circuits 24. In typical operation of digital magnetic tape transports, a data processing system provides command signals, such as forward and reverse commands, and the command and drive circuits generate acceleration, deceleration and continuous run commands for accelerating the tape 10 to speed within a relatively few milliseconds in a selected direction, or decelerating in comparable time intervals.

The supply and takeup reels 12, 14 are driven by reel drive motors 26, 28 respectively, the masses and inertias involved being substantially greater than the comparable factors for the capstan drive system. In the present example of a practical system, approximately 100 milliseconds are required for the reel drive system to bring the reel up to capstan speed, in contrast to the few milliseconds required for the capstan speed, in contrast to the few milliseconds required for the capstan drive. On the other hand, the top speed of the reel drive is somewhat higher than that of the capstan speed in order that the reel drive can overtake the capstan drive and buffer loops and the tape can be stabilized relative to a selected loop sensor.

A pair of vacuum chambers 30, 32 are employed for buffering between the first acting capstan system and the relatively slower acting reel drive systems, the right-hand vacuum chamber 30 (as viewed in the drawing) being disposed between the capstan 20 and the supply reel 12, and the left-hand vacuum chamber 32 being between the capstan 20 and the takeup reel 14. Low inertia, low friction guides 34, typically air bearing guides, are disposed along the tap path between the vacuum chambers 30, 32, and the desired pressure differentials across the tape loops within the chambers 30, 32 are established by a vacuum source 36 coupled to outlets at the bottom ends of the chambers 30, 32. Small buffer pockets 38, 40 are disposed on opposite sides of the capstan 20 for buffering tape transients induced by the sudden accelerations and decelerations, small outlets in the bottoms of these buffer pockets 38, 40 being coupled to the vacuum source 36.

A tachometer 42 is located between the vacuum chamber 30 and the supply reel 12 and has an armature 44 which provides a reel motor-braking signal that is proportional to tape velocity. Similarly a tachometer 46 with armature 48 is located between the vacuum chamber 32 and the takeup reel 14. A guide 50 is located between each tachometer 42, 46 and the respective reel 12, 14. The tachometers 42, 46 and the guides 50 guide the tape between the vacuum chambers and the associated tape packs on the reels. Within each vacuum chamber a short loop detector 52 is disposed at approximately the upper end of a chamber 30, 32 to detect the condition in which the tape loop becomes excessively short due to failure of a component or some extraneous influence on the tape, which might result in loss of a loop from within the chamber and consequent damage. Similarly a long loop detector 54 is disposed approximate the lower end of each chamber 30, 32 to detect the condition in which the tape loop becomes excessively long.

The majority of the elements heretofore discussed are conventional to systems of this type, and it will be recognized that a variety of guiding, driving and vacuum chamber arrangements may be utilized.

In accordance with the invention, however, like systems are utilized for sensing loop length within the chambers 30, 32, and controlling the respective reel drive motors 26, 28 so as to maintain full control of the loop length while providing the appropriate buffering action between the tape drive and the reels. Like arrangements of light sources and photosensors are used between the right-hand and left-hand vacuum chambers 30, 32 and only the system incorporated in conjunction with the left-hand vacuum chamber 32 will be described in detail. The circuits responsive to the loop length signals from the right-hand chamber 30 have been designated as the reel motor servo and drive circuits 56 coupled to the reel drive motor 26, and the following description as to the reel servo for the takeup reel system should be understood as applicable to the supply reel system as well.

In the left-hand vacuum chamber 32, a pair of spaced-apart photosensors 58, 60 hereafter referred to as the upper and lower sensors respectively, are disposed at selected spaced-apart regions along the length of the vacuum chamber adjacent the upper open end and the opposite lower closed end of the chamber respectively. A predetermined length relationship is used in this respect to establish a given proportionality between the various zones of the vacuum chamber. The upper zone, that is the zone above the lower edge of the photosensor 58, may be taken to have a length of unity. This length is adequate to provide storage of tape sufficient to enable the reel drive motor 28 to overtake the capstan drive system, starting with the reel drive motor 29 at zero velocity. The distance from the upper edge of the lower sensor 60 to the effective bottom of the chamber then is also unity, for the same purpose. The distance and the zone between the two sensors, which may be referred to as the dead zone in that no proportional varying signal is derived from the sensors 58, 60 is then taken as three times unity, to permit the tape loop to remain in this zone as the reel drive is decelerated to rest in response to the braking signal from the tachometer armature 48.

Oppositely disposed within the vacuum chamber wall on the opposite side from the upper sensor 58 is one or more radiation devices such as a grouping of three light bulbs 62, 64, 66 disposed in apertures in the side of the wall, and each energized from a suitable source, here shown as a DC source 68. The use of an array of bulbs insures more uniform dispersions of the light falling on the oppositely disposed sensor, although more or fewer light sources may be utilized, and they may be disposed in the back or even front walls of the chamber, as long as light is incident therefrom on the sensor. The sensor itself is preferably a silicone solar cell, because of the relatively low cost and reliability of such units and the amplitude of the signals which they generate. A separate array of light bulbs 70, 72, 74 is disposed in the wall of the vacuum chamber 32 opposite the lower sensor 60.

Signals from the upper sensor 58 are amplified by a first operation amplifier 76 prior to being applied to an input of a summing junction 78 both directly via a circuit path and through a Schmitt trigger 82. A second operational amplifier 84 receives signals from the lower sensor 60 for amplification prior to their application to an input of the summing junction 78 via a circuit path 86 and through a Schmitt trigger 88. The Schmitt triggers 82 and 88 increase the magnitude of the tape loop position signals from the operational amplifiers 76, 84 by a predetermined amount by adding signals of predetermined value thereto whenever the magnitude of the position signals exceeds a predetermined threshold value. The summing junction 78 receives a tape loop or position feedback signals and the reel motor braking or velocity feedback signal from the tachometer armature 48 and applies a signal representing the algebraic sum of these signals to a reel drive power amplifier 90. The reel drive amplifier 90 in turn drives the reel drive motor 28.

Figure 2:
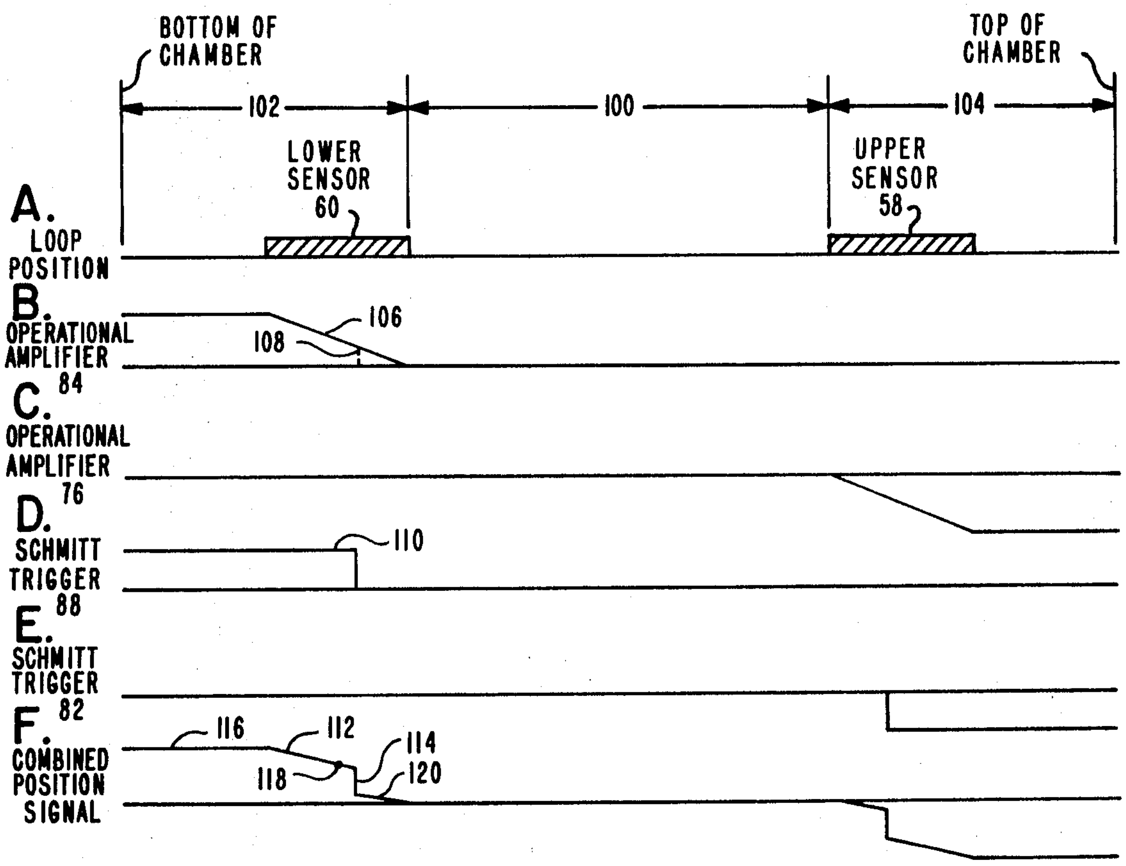

The operation of reel servosystem of FIG. 1 may be better understood with reference to FIG. 2. FIG. 2A is a schematic representation of the length of the vacuum chamber 32 and included sensors 58 and 60 and, as such, provides a reference scale for FIGS. 2B–2F. FIGS. 2B–2F represent the magnitudes of various signals provided at different points throughout the servosystem as a function of tape loop position along the length of the vacuum chamber 32. FIGS. 2B and 2C respectively represent the tape loop position signals provided by the operation amplifiers 84 and 76, while FIGS. 2D and 2E respectively represent the step increase signals provided by the Schmitt triggers 88 and 82. FIG. 2F represents the combined position feedback signal as provided to the summing junction 78 by the triggers 88, 82 and the operational amplifiers 84, 76. In FIG. 2A the region or dead zone between the sensors 58 and 60 is conveniently designated 100. Likewise, the region between the upper edge of the lower sensor 60 and the bottom of the vacuum chamber 32 is conveniently designated 102, and the region between the lower edge of the upper sensor 58 and the top or open end of the chamber is designated 104.

If the capstan 20 has just been stopped so as to bring the tape loop into the dead zone 100 and an appropriate command is thereafter immediately received so as to cause the capstan to feed tape in the vacuum chamber 32, the tape loop moves downwardly within the chamber toward the lower sensor 60. As the loop reaches the upper edge of the sensor 60, the sensor 60 and associated operation amplifier 84 respond by generating a ramplike signal 106 of given polarity as shown in FIG. 2B. As the loop continues to move downwardly a threshold value 108 reached at which the Schmitt trigger 88 generates a signal 110 of predetermined, constant magnitude and like polarity shown in FIG. 2D. The remaining portion 112 of the ramplike portion of the signal 106 of FIG. 2B is accordingly increased by a step 114 as shown in FIG. 2F. At this point the position feedback signal shown in FIG. 2F causes acceleration of the reel motor 28 in a direction to pull the tape out of the chamber 32. The loop, however, continues to move downwardly causing the signal shown in FIG. 2F to reach a maximum value 116. The tape loop will continue to move down until the tape speed as sensed by the tachometer 46 is slightly greater than the tape speed at the capstan. At this point the tape loop reverses its travel and moves up at a controlled velocity toward the lower sensor 60. The magnitude of the signal 110 provided by the trigger 88 is chosen to approximately equal the magnitude of the tachometer velocity feedback signal when the tape is being driven at steady state speed in either direction. Accordingly, the signal 110 effectively cancels the opposite polarity velocity feedback signal, and the tape loop position for steady state conditions of tape drive is largely determined by the remaining portion of the position feedback signal as provided by the operational amplifier 84. The loop thus stabilizes at a steady state position along the length of the lower sensor 60 as represented, for example, by a point 118 shown in FIG. 2F. At this point the combined signal at the output of the summing junction 78 has just enough magnitude to overcome the friction losses in the system.

The loop remains in the steady state position adjacent the lower sensor 60 until the capstan stops the tape or reverses direction. With the velocity feedback signal from the tachometer 46 cancelled by the signal from the Schmitt trigger 88 only a relatively small signal is required from the sensor 60 to maintain the loop in a stable condition. Accordingly, it will be appreciated by those skilled in the art that the use of linear sensors in combination with a tachometer and Schmitt triggers according to the invention provides for rapid achievement and maintenance of a stable loop condition using a minimum amount of power. The small amount of power required provides a small, steady torque by the reel motor 28, and avoids the constant reel oscillations and attendant power losses present in those prior art systems where the tape loop must oscillate about a point sensor.

If the direction of capstan drive is reversed in response to an appropriate command so as to tend to draw tape out of the vacuum chamber 32, the tape loop moves up into the dead zone 100, at which point the position feedback signal is of zero value and only the velocity feedback signal is applied via the summing junction 78 to the reel motor 28. The velocity signal which is a braking signal having a polarity which opposes the direction of rotation of the reel drive motor 28 decelerates the reel 14 to rest. As the tape loop continues to move up, it enters the region 104 shown in FIG. 2A at which point the upper sensor 58 and associated operational amplifier 76 generate a signal as shown in the right-hand portion of FIG. 2C. This signal is opposite in polarity to the signal generated by the lower sensor 60. As in the case of the Schmitt trigger 88, the trigger 82 provides a signal of the same polarity as the signal from the operational amplifier 76 as shown in FIG. 2E whenever the magnitude of the signal from the amplifier 76 exceeds a predetermined threshold value. The tape loop continues to move up until the tachometer tape speed exceeds the capstan tape speed, then moves down and stabilizes at a steady state location along the length of the upper sensor 58 in the same manner as previously described in connection with the lower sensor 60. Again, the signal from the Schmitt trigger 82 cancels the braking signal provided by the tachometer 46, so that only a relatively small signal from the upper sensor 58 is required in order to maintain the tape loop in a stable, steady state condition.

If the capstan is now decelerated and brought to rest, the tape loop moves down along the upper sensor 58 until it enters the dead zone 100 at which point the position feedback signal ceases and the velocity feedback signal from the tachometer 46 assumes complete control of the reel drive motor 28. The velocity feedback signal brakes the reel 14 and quickly decelerates the reel substantially to rest. Thereafter the vacuum from the source 36 draws the loop downwardly to the lower sensor 60. However, unlike many prior art systems in which the tape loop is rapidly drawn down and then oscillated about a point sensor, the loop in systems of the present invention moves down slowly due to the relatively small signal generated by the tachometer 46 in response to the slight tape motion thereat. When the loop reaches the lower sensor 60 a lower ramplike region 120 is entered as seen in FIG. 2F. The resulting relatively small signal generated by the sensor 60 and associated operational amplifier 84 produces enough torque in the reel motor 28 to balance the effects of the vacuum pull on the tape loop, and the loop remains stabilized in preparation for the next tape command. The tape loop will always stabilize at the lower sensor 60 when the tape is stopped, regardless of the direction in which the tape was previously being driven by the capstan. Again it will be appreciated that unlike many prior art systems in which the tape loop is required to oscillate about a point sensor when the tape is at rest, systems according to the present invention maintain the loop in a stable condition using only a relatively small signal from the lower sensor.

It will be seen from the above description that reel servo systems according to the present invention maintain the tape loop within the vacuum chamber independent of tape motion at the capstan. The use of linear sensors provides for loop stabilization during steady state operation of the capstan, thereby minimizing power dissipation in both the power amplifier 90 and the reel drive motor 28. Loop stabilization is greatly enhanced by the ramp-step-ramp signal characteristics achieved by use of the Schmitt triggers in conjunction with the sensors and operational amplifiers.

While the invention has been particularly shown and described with reference to a particular embodiment thereof, it will be understood by those skilled in the art that changes in form and details may be made therein without departing from the spirit and scope of the invention.

We claim:

1. In a digital tape transport having at least one tape reel, at least one capstan driving means, and at least one tape storage chamber located so as to receive a portion of a magnetic tape extending between the reel and the capstan driving means and form a loop in the tape, a servo system for controlling the operation of the reel to in turn control the length of the tape loop within the storage chamber comprising:

first sensor means located at a long loop position within the storage chamber and responsive to the tape loop to generate a signal whenever the tape loop is at least long enough to reside in the vicinity of the first sensor means;

second sensor means located at a short loop position within the storage chamber and responsive to the tape loop to generate a signal whenever the tape loop is at least short enough to reside in the vicinity of the second sensor means;

means responsive to the magnetic tape between the loop and the reel for generating a signal generally proportional to the velocity of the magnetic tape thereat;

means responsive to the tape loop position for generating a signal when the tape loop is longer than a selected point in the vicinity of the first sensor and when the tape loop is shorter than a selected point in the vicinity of the second sensor; and summing means for algebraically combining the signals generated by the first and second sensor means, the means for generating, and the magnetic tape responsive means to provide a driving signal for the reel.

2. A servosystem in accordance with claim 1 wherein each of the signals generated by the first and second sensor means varies in direct relation to the location of the tape loop along the length of the sensor means.

3. A servosystem in accordance with claim 2, wherein said means for generating generates a signal whenever the signal from the first sensor means exceeds a selected threshold and whenever the signal from the second sensor means exceeds a selected threshold.

4. A servosystem in accordance with claim 1, wherein the signal generated by the first sensor means has a first polarity, the signal generated by the second sensor means has a second polarity opposite the first polarity, and the signal generally proportional to the velocity of the magnetic tape has the first polarity whenever the magnetic tape between the loop and the reel is traveling in a direction tending to draw tape out of the storage chamber and has the second polarity whenever the magnetic tape between the loop and the reel is traveling in a direction tending to feed tape into the storage chamber.

5. A reel servosystem for a tape extending between a capstan and a reel, the reel being driven by a reel motor, comprising:

a tape storage vacuum chamber, the chamber receiving a portion of the tape between the capstan and the reel to form a tape loop;

first and second loop length sensors disposed at long and short loop positions respectively along the vacuum chamber and each being responsive to location of the tape loop in the vicinity thereof to generate a signal which varies in direct relation to the location of the tape loop along the length of the sensor so as to provide the signal with a generally ramplike characteristic for various different positions of the tape loop along the length of the sensor;

means individually associated with each of the sensors and responsive to the signal generated thereby for providing a modified signal with a generally steplike increase whenever the signal magnitude exceeds a predetermined threshold value, the resulting signal characteristic for various different positions of the tape along the length of the sensor comprising two generally ramplike portions of similar slope separated by a generally steplike portion;

means responsive to the tape between the vacuum chamber and the reel for providing a signal representative of the velocity of the tape; and summing means coupled to receive the modified signals from the first and second loop length sensors and the velocity representative signal for provide a servo error control signal to drive the reel motor.

6. A reel servosystem in accordance with claim 5, wherein the means for providing a velocity representative signal comprises a tachometer.

7. A reel servosystem in accordance with claim 5, wherein each of the means for modifying the signal waveform comprises a Schmitt trigger coupled in parallel with the output of the associated sensor.

8. A reel servosystem in accordance with claim 5, wherein the signal generated by the first loop length sensor has a polarity tending to drive the reel motor in a direction to draw tape out of the vacuum chamber, the signal generated by the second loop length sensor has a polarity tending to drive the reel motor in a direction to feed tape into the vacuum chamber, and the velocity representative signal has a polarity tending to decelerate the reel to rest.

9. For use in a magnetic tape transport in which a tape extends from a reel to tape driving means via an elongated vacuum chamber having an open first end through which the tape extends to form a loop in the tape and a second end opposite the first end, a servosystem for the reel comprising:

a short loop sensor disposed adjacent the first end of the vacuum chamber, the short loop sensor being responsive to the tape loop to generate a short loop signal which varies linearly with position of the tape loop along the length of the sensor from zero value when the tape loop is on the opposite side of the short loop sensor from the first end of the vacuum chamber to a maximum value when the tape loop is between the short loop sensor and the first end of the vacuum chamber;

a long loop sensor disposed adjacent the second end of the vacuum chamber and spaced apart from the short loop sensor, the long loop sensor being responsive to the tape loop to generate a long loop signal which varies linearly with position of the tape loop along the length of the sensor from zero value when the tape loop is on the opposite side of the long loop sensor from the second end of the vacuum chamber to a maximum value when the tape loop is between the long loop sensor and the second end of the vacuum chamber, the long loop signal having a polarity opposite the polarity of the short loop signal;

summing means for providing at an output thereof the algebraic sum of signals applied to a plurality of inputs thereof, the algebraic sum at the output being applied to drive the reel;

means coupling the short loop signal to one of the summing means inputs and including means responsive to the short loop signal for adding a signal of predetermined magnitude and like polarity to the short loop signal to provide a short loop position feedback signal whenever the magnitude of the short loop signal exceeds a predetermined threshold level;

means coupling the long loop signal to another one of the summing means inputs and including mans responsive to the long loop signal for adding a signal of predetermined magnitude and like polarity to the long loop signal to provide a long loop position feedback signal whenever the magnitude of the long loop signal exceeds a predetermined threshold level; and tachometer means coupled to still another one of the summing means inputs and responsive to the velocity of the tape between the vacuum chamber and the reel for providing to the associated summing means input a velocity feedback signal having a magnitude proportional to the speed of the tape and a polarity representing the direction of travel of the tape.

10. A servosystem in accordance with claim 9, wherein each of the means for adding a signal of predetermined magnitude comprises a Schmitt trigger.

11. A servosystem in accordance with claim 10, further including a different operational amplifier coupled between each of the sensors and the associated Schmitt trigger, and a power amplifier coupled to the output of the summing means.

12. A servosystem in accordance with claim 9, wherein the short loop position feedback signal is of greater magnitude than the velocity feedback signal when the tape loop is between the short loop sensor and the first end of the vacuum chamber and is equal in magnitude to the velocity feedback signal when the tape loop is at a steady state position along the length of the short loop sensor, and the long loop position feedback signal is of greater magnitude than the velocity feedback signal when the tape loop is between the long loop sensor and the second end of the vacuum chamber and is equal in magnitude to the velocity feedback signal when the tape loop is at a steady state position along the length of the long loop sensor.

13. A digital magnetic tape transport comprising:

supply and takeup reels, each having a drive motor coupled thereto;

a magnetic tape extending between the supply and takeup reels;

tape driving means engaging a portion of the tape extending between the supply and takeup reels and responsive to external command signals to bidirectionally drive the tape;

transducing means positioned adjacent a portion of the tape extending between the supply and takeup reels;

first and second vacuum chambers, the first vacuum chamber being positioned to receive and form a loop in a portion of the tape extending between the tape driving means and the takeup reel and the second vacuum chamber being positioned to receive and form a loop in a portion of the tape extending between the tape driving means and the takeup reel; and separate reel servo means associated with each of the first and second vacuum chambers, each of the reel servo means including long and short loop sensor means disposed at spaced-apart locations along the length of the associated vacuum chamber, each of the sensor means being responsive to the tape loop to generate a signal representing the position of the tape loop along the length of the sensor means, long loop generating means responsive to the long loop sensor means for generating a signal when the tape loop extends beyond a selected point along the long loop sensor means, short loop-generating means responsive to the short loop sensor means for generating a signal when the tape loop is shorter than a selected point along the short loop sensor means, means responsive to the tape between the associated vacuum chamber and reel for generating a signal representing the velocity of the tape thereat, and means responsive to the signals from the sensor means, the signals from the long and short loop-generating means, and the velocity signal for combining the signals, the combined signals being applied to the drive motor for the associated reel.

14. In a digital tape transport having at least one tape reel, at least one capstan driving means, and at least one tape storage chamber located so as to receive a portion of a magnetic tape extending between the reel and the capstan driving means and form a loop in the tape, a servosystem for controlling the operation of the reel to in turn control the length of the tape loop within the storage chamber comprising:

first sensor means located at a long loop position within the storage chamber and responsive to the tape loop to generate a signal which varies in direct relation to the location of the tape loop along the length of the sensor means whenever the tape loop is at least long enough to reside in the vicinity of the first sensor means;

second sensor means located at a short loop position within the storage chamber and responsive to the tape loop to generate a signal which varies in direct relation to the location of the tape loop along the length of the sensor means whenever the tape loop is at least short enough to reside in the vicinity of the second sensor means;

means responsive to the magnetic tape between the loop and the reel for generating a signal generally proportional to velocity of the magnetic tape thereat;

means responsive to each of the signals generated by the first and second sensor means for increasing the amplitude of each such signal by a predetermined amount approximately equal to the amplitude of the magnetic tape velocity signal for steady state operation of the tape transport whenever the signal amplitude exceeds a predetermined threshold value; and summing means for algebraically combining the increased amplitude signals generated by the first and second sensor means and the amplitude increasing means, and the magnetic tape responsive means to provide a driving signal for the reel.